(12) United States Patent
Somers et al.

(10) Patent No.: US 6,820,213 B1
(45) Date of Patent: Nov. 16, 2004

(54) FAULT-TOLERANT COMPUTER SYSTEM WITH VOTER DELAY BUFFER

(75) Inventors: Jeffrey S. Somers, Northborough, MA (US); Wen-Yi Huang, Acton, MA (US); Mark D. Tetreault, Webster, MA (US); Timothy M. Wegner, Westborough, MA (US)

(73) Assignee: Stratus Technologies Bermuda, Ltd. (BM)

( * ) Notice: Subject to any disclaimer, the term of this patent is extended or adjusted under 35 U.S.C. 154(b) by 0 days.

(21) Appl. No.: 09/548,528

(22) Filed: Apr. 13, 2000

(51) Int. Cl.[7] .................................................. G06F 11/00
(52) U.S. Cl. ............................................ 714/11; 714/45
(58) Field of Search ............................. 714/10, 11, 13, 714/31, 45, 48, 6, 12, 15, 23, 49; 711/162

(56) References Cited

U.S. PATENT DOCUMENTS

| | | | |
|---|---|---|---|
| 3,192,362 A | 6/1965 | Cheney | 235/153 |
| 3,533,065 A | 10/1970 | McGilvray | 340/172.5 |
| 3,533,082 A | 10/1970 | Schnabel | 340/172.5 |
| 3,544,973 A | 12/1970 | Borck et al. | 340/172.5 |
| 3,548,176 A | 12/1970 | Shutler | 235/153 |
| 3,593,307 A | 7/1971 | Gouge, Jr. | 340/172.5 |
| 3,641,505 A | 2/1972 | Artz et al. | 340/172.5 |
| 3,665,173 A | 5/1972 | Bouricius et al. | 235/153 |
| 3,681,578 A | 8/1972 | Stevens | 235/153 |
| 3,688,274 A | 8/1972 | Cormier et al. | 340/172.5 |
| 3,710,324 A | 1/1973 | Cohen et al. | 340/172.5 |
| 3,736,566 A | 5/1973 | Anderson et al. | 340/172.5 |
| 3,783,250 A | 1/1974 | Fletcher et al. | 235/153 |

(List continued on next page.)

FOREIGN PATENT DOCUMENTS

| | | | |
|---|---|---|---|
| DE | 1200155 | 9/1965 | |
| EP | 0 301 499 A2 | 2/1989 | |
| EP | 0 428 330 A3 | 5/1991 | ..................... 13/30 |
| EP | 0 475 005 | 11/1995 | ..................... 15/16 |
| EP | 0 293 860 B1 | 2/1996 | |
| EP | 0 742 507 A1 | 11/1996 | |
| EP | 0 390 567 B1 | 6/1999 | ..................... 29/6 |
| EP | 0 974 912 A2 | 1/2000 | ..................... 15/16 |
| GB | 1 200 155 | 7/1970 | |
| GB | 2 060 229 A | 4/1981 | |
| GB | 2 268 817 A | 1/1994 | ..................... 11/16 |
| WO | WO 99/66406 | 12/1999 | ..................... 11/16 |

Primary Examiner—Robert Beausoliel
Assistant Examiner—Gabriel L. Chu
(74) Attorney, Agent, or Firm—Testa, Hurwitz & Thibeault, LLP

(57) ABSTRACT

A fault-tolerant computer system includes first and second central processing units (CPUs) producing essentially identical data output streams, a voter delay buffer having a first FIFO buffer and a second FIFO buffer, and an I/O module connected to the CPUs. The I/O module includes a comparator for bitwise comparing the CPU data output streams. The first CPU data output stream is transmitted to peripheral devices if both CPU outputs remain substantially identical. Otherwise, if the comparator indicates differences, queued first and second CPU data are routed to the first and second FIFOs respectively, and subsequent data are retained in respective CPU buffers. While the CPUs continue processing, ongoing diagnostic procedures attempt to identify one or the other of the CPUs as malfunctioning and the remaining CPU as correctly-functioning. If the resulting diagnosis is inconclusive, the CPU having the lower rate of error correction is identified as being correctly-functioning. In either case, the buffered output and the subsequently processed data output stream from the correctly-functioning CPU are thereafter transmitted to the peripheral devices.

15 Claims, 3 Drawing Sheets

U.S. PATENT DOCUMENTS

| | | | |
|---|---|---|---|
| 3,795,901 A | 3/1974 | Boehm et al. | 340/172.5 |
| 3,805,039 A | 4/1974 | Stiffler | 235/153 |
| 3,820,079 A | 6/1974 | Bergh et al. | 340/172.5 |
| 3,840,861 A | 10/1974 | Amdahl et al. | 340/172.5 |
| 3,879,712 A | 4/1975 | Edge et al. | 340/172.5 |
| 3,991,407 A | 11/1976 | Jordan, Jr. et al. | 340/172.5 |
| 3,997,896 A | 12/1976 | Cassarino, Jr. et al. | 340/172.5 |
| 4,015,246 A | 3/1977 | Hopkins, Jr. et al. | 340/172.5 |
| 4,030,074 A | 6/1977 | Giorcelli | 364/200 |
| 4,032,893 A | 6/1977 | Moran | 340/166 |
| 4,059,736 A | 11/1977 | Perucca et al. | 179/175.2 |
| 4,099,234 A | 7/1978 | Woods et al. | 364/200 |
| 4,176,258 A | 11/1979 | Jackson | 235/302 |
| 4,228,496 A | 10/1980 | Katzman et al. | 364/200 |
| 4,245,344 A | 1/1981 | Richter | 371/68 |
| 4,263,649 A | 4/1981 | Lapp, Jr. | 364/200 |
| 4,275,440 A | 6/1981 | Adams, Jr. et al. | 364/200 |
| 4,309,754 A | 1/1982 | Dinwiddie, Jr. | 364/200 |
| 4,323,966 A | 4/1982 | Whiteside et al. | 364/200 |
| 4,356,550 A | 10/1982 | Katzman et al. | 364/200 |
| 4,358,823 A | 11/1982 | McDonald et al. | 364/200 |
| 4,366,535 A | 12/1982 | Cedolin et al. | 364/200 |
| 4,369,494 A | 1/1983 | Bienvenu et al. | 364/200 |
| 4,375,683 A | 3/1983 | Wensley | 371/36 |
| 4,434,463 A | 2/1984 | Quinquis et al. | 364/200 |
| 4,449,182 A | 5/1984 | Rubinson et al. | 364/200 |
| 4,453,215 A | 6/1984 | Reid | 364/200 |
| 4,467,436 A | 8/1984 | Chance et al. | 364/513 |
| 4,484,273 A | 11/1984 | Stiffler et al. | 364/200 |
| 4,486,826 A | 12/1984 | Wolff et al. | 364/200 |
| 4,503,496 A | 3/1985 | Holzner et al. | 364/200 |
| 4,503,535 A | 3/1985 | Budde et al. | 371/61 |
| 4,507,784 A | 3/1985 | Procter | 371/61 |
| 4,543,628 A | 9/1985 | Pomfret | 364/200 |
| 4,562,575 A | 12/1985 | Townsend | 371/9 |
| 4,583,224 A | 4/1986 | Ishii et al. | 371/36 |
| 4,589,066 A | 5/1986 | Lam et al. | 364/200 |
| 4,590,554 A | 5/1986 | Glazer et al. | 364/200 |
| 4,597,084 A | 6/1986 | Dynneson et al. | 371/51 |
| 4,608,631 A | 8/1986 | Stiffler et al. | 364/200 |
| 4,610,013 A | 9/1986 | Long et al. | 371/9 |
| 4,622,667 A | 11/1986 | Yount | 371/9 |
| 4,628,447 A | 12/1986 | Cartret et al. | 364/200 |
| 4,630,193 A | 12/1986 | Kris | 364/200 |
| 4,633,394 A | 12/1986 | Georgiou et al. | 364/200 |
| 4,633,467 A | 12/1986 | Abel et al. | 371/16 |
| 4,644,498 A | 2/1987 | Bedard et al. | 364/900 |
| 4,648,031 A | 3/1987 | Jenner | 364/200 |
| 4,654,846 A | 3/1987 | Goodwin et al. | 371/8 |
| 4,654,857 A | 3/1987 | Samson et al. | 371/68 |
| 4,669,056 A | 5/1987 | Waldecker et al. | 364/900 |
| 4,669,079 A | 5/1987 | Blum | 370/85 |
| 4,686,677 A | 8/1987 | Flora | 371/61 |
| 4,700,292 A | 10/1987 | Campanini | 364/200 |
| 4,703,420 A | 10/1987 | Irwin | 364/200 |
| 4,736,377 A | 4/1988 | Bradley et al. | 371/37 |
| 4,739,498 A | 4/1988 | Eichhorn | 365/200 |
| 4,750,177 A | 6/1988 | Hendrie et al. | 371/32 |
| 4,799,140 A | 1/1989 | Dietz et al. | 364/140 |
| 4,805,091 A | 2/1989 | Thiel et al. | 364/200 |
| 4,809,169 A | 2/1989 | Sfarti et al. | 364/200 |
| 4,816,990 A | 3/1989 | Williams | 364/200 |
| 4,827,409 A | 5/1989 | Dickson | 364/200 |
| 4,866,604 A | 9/1989 | Reid | 364/200 |
| 4,872,106 A | 10/1989 | Slater | |
| 4,905,181 A | 2/1990 | Gregory | 364/900 |
| 4,907,232 A | 3/1990 | Harper et al. | 371/36 |
| 4,914,580 A | 4/1990 | Jensen et al. | 364/200 |
| 4,916,695 A | 4/1990 | Ossfeldt | 371/9.1 |
| 4,926,315 A | 5/1990 | Long et al. | 364/200 |
| 4,931,922 A | 6/1990 | Baty et al. | 364/200 |
| 4,939,643 A | 7/1990 | Long et al. | 364/200 |
| 4,974,144 A | 11/1990 | Long et al. | 364/200 |
| 4,974,150 A | 11/1990 | Long et al. | 364/200 |
| 4,985,830 A | 1/1991 | Atac et al. | 364/200 |
| 4,994,960 A | 2/1991 | Tuchler et al. | 364/200 |
| 5,005,174 A | 4/1991 | Bruckert et al. | 371/68.3 |
| 5,020,024 A | 5/1991 | Williams | 364/900 |
| 5,083,258 A | 1/1992 | Yamasaki | 395/725 |
| 5,089,958 A | 2/1992 | Horton et al. | 395/575 |
| 5,099,485 A | 3/1992 | Bruckert et al. | 371/68.3 |
| 5,117,486 A | 5/1992 | Clark et al. | 395/250 |
| 5,136,498 A | 8/1992 | McLaughlin et al. | |
| 5,136,704 A | 8/1992 | Danielsen et al. | 395/575 |
| 5,138,257 A | 8/1992 | Katsura | 324/158 |
| 5,155,809 A | 10/1992 | Baker et al. | 395/200 |
| 5,157,663 A | 10/1992 | Major et al. | 371/9.1 |
| 5,179,663 A | 1/1993 | Iimura | 395/250 |
| 5,193,162 A | 3/1993 | Bordsen et al. | 395/425 |
| 5,193,180 A | 3/1993 | Hastings | 395/575 |
| 5,220,668 A | 6/1993 | Bullis | 395/650 |
| 5,226,152 A * | 7/1993 | Klug et al. | 714/12 |
| 5,231,640 A | 7/1993 | Hanson et al. | 371/68.3 |
| 5,243,704 A | 9/1993 | Baty et al. | 395/325 |
| 5,247,522 A | 9/1993 | Reiff | 371/29.5 |
| 5,249,187 A | 9/1993 | Bruckert et al. | 371/68.1 |
| 5,251,303 A | 10/1993 | Fogg, Jr. et al. | 395/275 |
| 5,263,034 A | 11/1993 | Guenthner et al. | 371/68.3 |
| 5,270,699 A | 12/1993 | Signaigo et al. | 340/825.01 |
| 5,271,023 A | 12/1993 | Norman | 371/68.3 |
| 5,283,870 A | 2/1994 | Joyce et al. | 395/200 |
| 5,295,258 A | 3/1994 | Jewett et al. | 395/575 |
| 5,313,627 A | 5/1994 | Amini et al. | 395/575 |
| 5,317,726 A | 5/1994 | Horst | 395/575 |
| 5,321,706 A | 6/1994 | Holm et al. | 371/51.1 |
| 5,333,265 A | 7/1994 | Orimo et al. | 395/200 |
| 5,357,612 A | 10/1994 | Alaiwan | 395/200 |
| 5,361,267 A | 11/1994 | Godiwala et al. | 371/40.1 |
| 5,379,381 A | 1/1995 | Lamb | 395/275 |
| 5,384,906 A | 1/1995 | Horst | 395/550 |
| 5,388,242 A | 2/1995 | Jewett | 395/425 |
| 5,392,302 A | 2/1995 | Kemp et al. | 371/51.1 |
| 5,404,361 A | 4/1995 | Casorso et al. | 371/40.1 |
| 5,423,024 A | 6/1995 | Cheung | 395/575 |
| 5,428,766 A | 6/1995 | Seaman | 395/575 |
| 5,430,866 A | 7/1995 | Lawrence et al. | 395/575 |
| 5,463,755 A | 10/1995 | Dumarot et al. | 395/475 |
| 5,465,328 A | 11/1995 | Dievendorff et al. | 395/182.13 |
| 5,465,340 A | 11/1995 | Creedon et al. | 395/846 |
| 5,537,535 A | 7/1996 | Maruyama et al. | 395/183.01 |
| 5,550,986 A | 8/1996 | DuLac | 395/280 |
| 5,555,372 A | 9/1996 | Tetreault et al. | 395/182.13 |
| 5,574,865 A | 11/1996 | Hashemi | 395/283 |
| 5,581,750 A | 12/1996 | Haderle et al. | 395/618 |
| 5,583,987 A | 12/1996 | Kobayashi et al. | |
| 5,584,030 A | 12/1996 | Husak et al. | 395/750 |
| 5,586,253 A | 12/1996 | Green et al. | 395/185.06 |
| 5,600,784 A | 2/1997 | Bissett et al. | 395/182.1 |
| 5,613,162 A | 3/1997 | Kabenjian | 395/842 |
| 5,615,403 A | 3/1997 | Bissett et al. | 395/881 |
| 5,621,885 A | 4/1997 | Del Vigna, Jr. | 395/182.11 |
| 5,627,965 A | 5/1997 | Liddell et al. | 395/185.01 |
| 5,630,046 A | 5/1997 | Loise | 395/182.09 |
| 5,630,056 A | 5/1997 | Horvath et al. | 395/185.09 |
| 5,659,681 A | 8/1997 | Ojima | 395/183.19 |
| 5,671,443 A | 9/1997 | Stauffer et al. | 395/845 |
| 5,682,513 A | 10/1997 | Candelaria et al. | 395/440 |
| 5,694,541 A | 12/1997 | Service et al. | 395/183.22 |
| 5,696,905 A | 12/1997 | Reimer et al. | 395/227 |
| 5,701,410 A | 12/1997 | BeMent et al. | 395/183.19 |
| 5,701,457 A | 12/1997 | Fujiwara | 395/608 |

| | | | | | | | |
|---|---|---|---|---|---|---|---|
| 5,721,918 | A | | 2/1998 | Nilsson et al. | ............... | 395/618 |
| 5,724,581 | A | | 3/1998 | Kozakura | ................... | 395/618 |
| 5,737,601 | A | | 4/1998 | Jain et al. | ................... | 395/617 |
| 5,748,873 | A | * | 5/1998 | Ohguro et al. | ................ | 714/11 |
| 5,751,955 | A | | 5/1998 | Sonnier et al. | ........ | 395/200.19 |
| 5,758,065 | A | | 5/1998 | Reams et al. | .......... | 395/185.01 |
| 5,781,910 | A | | 7/1998 | Gostanian et al. | .......... | 707/201 |
| 5,787,485 | A | | 7/1998 | Fitzgerald, V et al. | ..... | 711/162 |
| 5,790,397 | A | | 8/1998 | Bissett et al. | ............... | 364/131 |
| 5,790,775 | A | | 8/1998 | Marks et al. | .......... | 395/182.07 |
| 5,802,265 | A | | 9/1998 | Bressoud et al. | ...... | 395/182.09 |
| 5,809,256 | A | | 9/1998 | Najemy | ...................... | 395/283 |
| 5,812,748 | A | | 9/1998 | Ohran et al. | ........... | 395/182.02 |
| 5,815,647 | A | | 9/1998 | Buckland et al. | ...... | 395/182.01 |
| 5,828,903 | A | | 10/1998 | Sethuram et al. | ........... | 395/817 |
| 5,838,899 | A | | 11/1998 | Leavitt et al. | ......... | 395/185.09 |
| 5,838,900 | A | | 11/1998 | Horvath et al. | ........ | 395/185.09 |
| 5,838,993 | A | | 11/1998 | Riley et al. | ................. | 395/842 |
| 5,845,060 | A | | 12/1998 | Vrba et al. | ............... | 395/182.1 |
| 5,862,145 | A | | 1/1999 | Grossman et al. | ............ | 371/5.1 |
| 5,870,301 | A | | 2/1999 | Yakushiji et al. | ........... | 364/132 |
| 5,875,308 | A | | 2/1999 | Egan et al. | ................. | 395/283 |
| 5,875,351 | A | | 2/1999 | Riley | ......................... | 395/842 |
| 5,881,251 | A | | 3/1999 | Fung et al. | ................. | 395/283 |
| 5,890,003 | A | | 3/1999 | Cutts, Jr. et al. | ........... | 395/736 |
| 5,892,928 | A | | 4/1999 | Wallach et al. | ............. | 395/283 |
| 5,894,560 | A | | 4/1999 | Carmichael et al. | ........ | 395/845 |
| 5,896,523 | A | | 4/1999 | Bissett et al. | ............... | 395/551 |
| 5,903,717 | A | | 5/1999 | Wardrop | | |
| 5,918,229 | A | | 6/1999 | Davis et al. | .................. | 707/10 |
| 5,928,339 | A | | 7/1999 | Nishikawa | ................... | 710/26 |
| 5,933,838 | A | | 8/1999 | Lomet | ........................ | 707/202 |
| 5,944,800 | A | | 8/1999 | Mattheis et al. | .............. | 710/23 |
| 5,953,538 | A | | 9/1999 | Duncan et al. | ............. | 395/842 |
| 5,956,474 | A | | 9/1999 | Bissett et al. | .......... | 395/182.09 |
| 5,956,476 | A | | 9/1999 | Ranson et al. | ......... | 395/183.06 |
| 5,968,185 | A | | 10/1999 | Bressoud et al. | ............. | 714/10 |
| 5,978,866 | A | | 11/1999 | Nain | ........................... | 710/22 |
| 5,982,672 | A | | 11/1999 | Moon et al. | ............ | 365/189.01 |
| 5,983,289 | A | | 11/1999 | Ishikawa et al. | ............... | 710/35 |
| 5,983,371 | A | | 11/1999 | Lord et al. | ..................... | 714/55 |
| 5,991,900 | A | | 11/1999 | Garnett | .................. | 395/183.19 |
| 5,996,035 | A | | 11/1999 | Allen et al. | .................. | 710/103 |
| 6,000,043 | A | | 12/1999 | Abramson | .................... | 714/44 |
| 6,009,535 | A | | 12/1999 | Halligan et al. | ................ | 714/5 |
| 6,012,120 | A | | 1/2000 | Duncan et al. | ............. | 710/129 |
| 6,021,456 | A | | 2/2000 | Herdeg et al. | .............. | 710/260 |
| 6,026,458 | A | | 2/2000 | Rasums | ...................... | 710/103 |
| 6,032,271 | A | | 2/2000 | Goodrum et al. | ............. | 714/56 |
| 6,038,685 | A | | 3/2000 | Bissett et al. | .................. | 714/12 |
| 6,041,375 | A | | 3/2000 | Bass et al. | ................... | 710/103 |
| 6,047,343 | A | | 4/2000 | Olarig | ........................ | 710/102 |
| 6,049,894 | A | | 4/2000 | Gates | .......................... | 714/41 |
| 6,055,584 | A | | 4/2000 | Bridges et al. | ................ | 710/27 |
| 6,062,480 | A | | 5/2000 | Evoy | .......................... | 235/492 |
| 6,065,017 | A | | 5/2000 | Barker | ....................... | 707/202 |
| 6,065,135 | A | * | 5/2000 | Marshall et al. | ............... | 714/11 |
| 6,067,550 | A | | 5/2000 | Lomet | ........................ | 707/202 |
| 6,073,196 | A | | 6/2000 | Goodrum et al. | ........... | 710/103 |
| 6,085,200 | A | | 7/2000 | Hill et al. | .................... | 707/202 |
| 6,098,137 | A | | 8/2000 | Goodrum et al. | ........... | 710/129 |
| 6,115,829 | A | | 9/2000 | Slegel et al. | | |
| 6,119,128 | A | | 9/2000 | Courter et al. | .............. | 707/202 |
| 6,125,417 | A | | 9/2000 | Bailis et al. | ................. | 710/103 |
| 6,141,718 | A | * | 10/2000 | Garnett et al. | .............. | 710/308 |
| 6,141,769 | A | | 10/2000 | Petivan et al. | ................ | 714/10 |
| 6,148,348 | A | * | 11/2000 | Garnett et al. | ................ | 710/14 |
| 6,199,171 | B1 | * | 3/2001 | Bossen et al. | ................ | 714/2 |
| 6,233,702 | B1 | * | 5/2001 | Horst et al. | ................... | 714/48 |
| 6,357,024 | B1 | * | 3/2002 | Dutton et al. | ................ | 714/45 |
| 6,374,365 | B1 | * | 4/2002 | Lahmann | ..................... | 714/12 |
| 6,393,582 | B1 | * | 5/2002 | Klecka et al. | ................ | 714/11 |
| 6,604,177 | B1 | * | 8/2003 | Kondo et al. | ................ | 711/150 |

\* cited by examiner ures when reading the detailed description to
FAULT-TOLERANT COMPUTER SYSTEM WITH VOTER DELAY BUFFER

CROSS-REFERENCE TO RELATED APPLICATIONS

This Application is related to the following commonly-assigned, co-pending application entitled METHOD AND SYSTEM FOR UPGRADING FAULT-TOLERANT SYSTEMS, identified by Cesari and McKenna File No. 104160-0010.

BACKGROUND OF THE INVENTION

1. Field of the Invention

The present invention is related to fault-tolerant computer systems and, in particular, to a method for efficiently providing reliable operation in a computer system.

2. Background Information

In most data processing applications, reliable performance of a computer system is critical. To provide for a specified level of reliability, the computer system may include at least one redundant, or backup, central processing unit (CPU), where the CPUs perform the same operations and provide the same data output stream. The input/output (I/O) buses of the CPUs are continually monitored and compared to identify any differences in their respective data streams. If signal differences are detected, a voting device applies predetermined criteria to identify one of the CPUs as malfunctioning. In a redundant computer system having two CPUs, for example, the voting device may identify the CPU having a history of greater cumulative error correction as the malfunctioning CPU. However, experience has shown that this method has an unacceptably low accuracy rate.

The accuracy rate improves with the addition of a second redundant CPU to the computer system. All three CPU outputs are monitored and, when differences are detected, the CPU determined to be malfunctioning is the CPU producing an output not in agreement with the other two CPUs. This approach, however, incurs the additional expense and complexity of integrating the third CPU into the computer system.

Another method used in computer systems having only two redundant CPUs is to have each CPU revert to an idle state and/or lose output data while diagnostic procedures are initiated to determine which CPU is malfunctioning. Based on the results of the diagnostic procedure, one CPU may be identified as malfunctioning. One undesirable side effect of this approach is that the operation of the computer system is impacted and may be severely disrupted while the CPUs are in the idle state.

It is therefore an object of the present invention to provide a computer system achieving a high degree of reliability with a redundant CPU.

It is a further object of the present invention to provide such a computer system in which a malfunctioning CPU can be identified without first placing the CPU into an idle state.

It is a still further object of the present invention to provide such a computer system in which computational data is not lost while the malfunctioning CPU is identified.

It is yet another object of the present invention to provide such a system in which a malfunctioning CPU can be identified with a high degree of reliability. Other objects of the invention will be obvious, in part, and, in part, will become apparent when reading the detailed description to follow.

SUMMARY OF THE INVENTION

The present invention comprises a fault-tolerant computer system which includes a pair of CPUs that produce essentially identical data output streams, a voter delay buffer having first and second FIFO buffers, and an I/O module interconnecting the CPUs and the FIFO buffers. The I/O module compares the data output streams from the two CPUs for differences. If both CPU output streams remain identical, the data output of a selected CPU is transmitted to one or more peripheral devices. Otherwise, if the comparator indicates differences, the data output stream from one CPU is rerouted to the first FIFO, and the data output streams from the other CPU is rerouted to the second FIFO. Meanwhile, the CPUs continue processing operations and ongoing diagnostic procedures to identify one of the CPUs as malfunctioning. The FIFOs provide buffering for the data output streams which would otherwise be discarded. Additionally, use of the FIFOs allows the CPUs to continue operation and avoid a disruption to the computer system. If neither CPU is diagnosed as malfunctioning, the I/O module uses data from a priority module to determine which CPU has a higher assigned priority, and identifies the higher-priority CPU as the correctly-functioning CPU. In either case, the computer system then provides the data held in the FIFO associated with the correctly-functioning CPU to the peripheral devices. By thus buffering the data output streams, the present invention allows the computer system to utilize the diagnostic procedures for increasing the probability of correctly identifying a CPU as malfunctioning.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
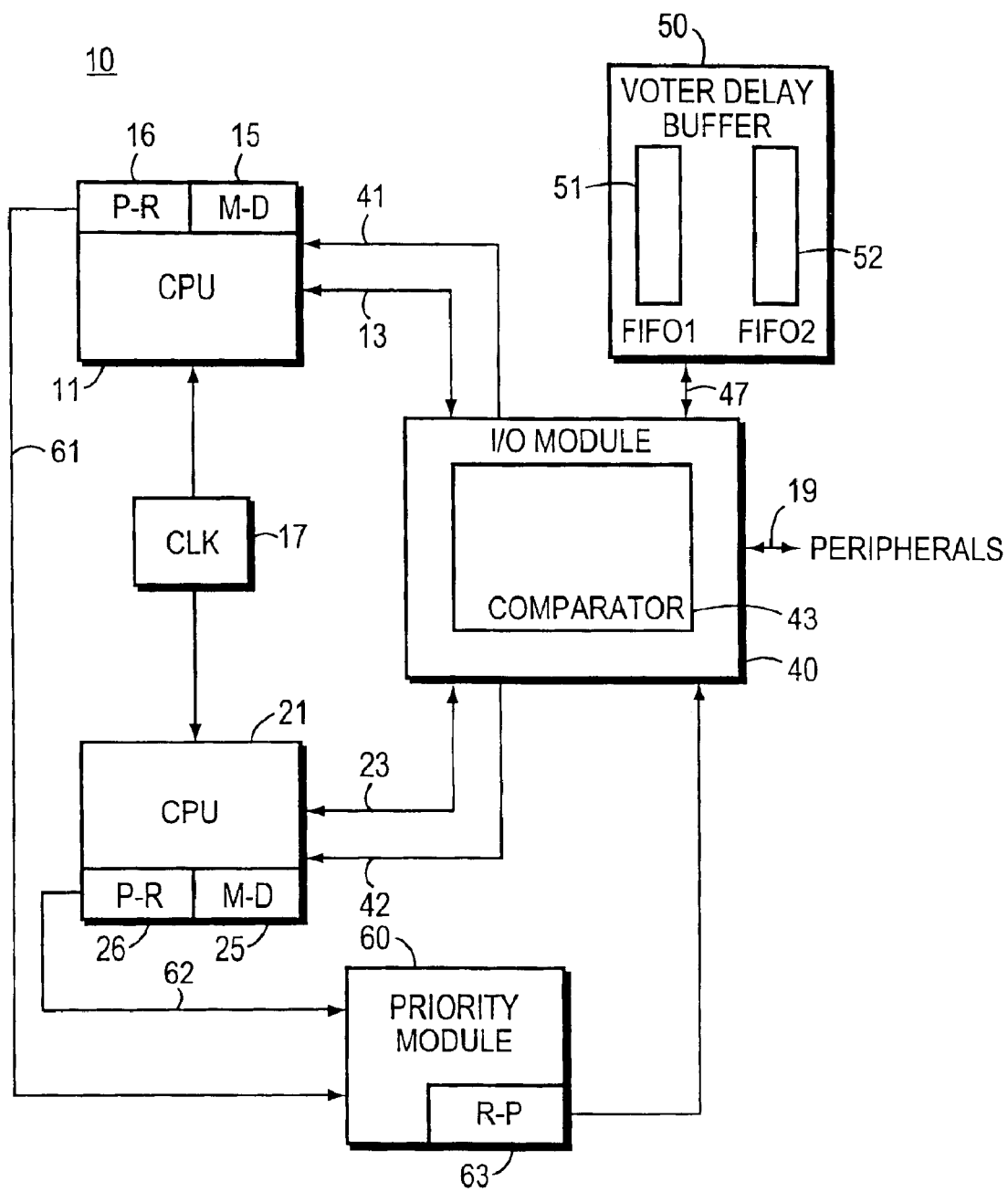
FIG. 1 is a functional block diagram of a fault-tolerant computer system in accordance with the present invention.

There is shown in FIG. 1 a fault-tolerant computer system 10 in accordance with the present invention. The computer system 10 includes a first CPU 11 and a second CPU 21. The first CPU 11 and the second CPU 21 are configured to operate in lock-step, or cycle-by-cycle synchronism with one another, as exemplified by a system clock 17. The first CPU 11 includes a maintenance and diagnostic subsystem 15, and the second CPU 21 includes a maintenance and diagnostic subsystem 25. The maintenance and diagnostic subsystems 15 and 25 function to identify and, if possible, correct internal processing errors detected in the operations of the respective CPUs 11 and 21.

The system also includes an I/O module 40 that controls data transfers between the CPUs 11 and 21 and associated peripheral devices (not shown). The first CPU 11 communicates with the I/O module 40 over a first I/O bus 13. Data flowing between the first CPU 11 and the peripheral devices are transmitted over the first I/O bus 13 to the I/O module 40, through the I/O module 40, and to the peripheral devices via a system I/O bus 19. Similarly, data flowing between the peripheral devices and the second CPU 21 is transmitted over a second I/O bus 23 connected to the I/O module 40. It should be understood that the respective data streams on the I/O buses 13 and 23 are essentially identical when both the first CPU 11 and the second CPU 21 are operating error-free.

During normal operation, transient errors may occur within either or both the first CPU 11 and the second CPU 21. Many of the errors are detected and some corrected internally, such as by using error correction logic or parity protocol logic, before transmission over either the first I/O bus 13 or the second I/O bus 23. An ongoing maintenance history as to the occurrence of these transient errors in the first CPU 11 is retained in a first priority register 16. The first priority register 16 is kept updated by the maintenance and diagnostic subsystem 15. Similarly, transient errors occurring in the second CPU 21 are tracked with a second priority register 26 which is kept updated by the maintenance and diagnostic subsystem 25. This maintenance information is made available to a priority module 60 via either a first CPU priority line 61 or a second CPU priority line 62. The priority module 60 includes a software program 63 to assign relative priorities to the two CPUs 11 and 21 based on their relative operational performance parameters. Such statistical data may include, for example, the history of detected transient errors or the length of time a given CPU has been operating in the computer system 10. These statistical data are used to assign relative priorities to the first CPU 11 and the second CPU 21. These assigned priorities are provided to the I/O module 40.

The I/O module 40 includes a comparator 43 which performs a bit-by-bit cycle compare procedure on the data output streams passing into the I/O module 40 on the I/O buses 13 and 23. The comparator may be, for example, an XOR gate or any other known component for comparing two bit values. If the cycle compare procedure detects a difference between the two data output streams, this may be an indication that one of the CPUs 11 and 21 is malfunctioning. Accordingly, the I/O module 40 responds by issuing a STOP command to both the first CPU 11 and the second CPU 21 over a first command line 41 and a second command line 42 respectively.

When the STOP command is issued, the I/O module 40 stops transmitting output data on the system I/O bus 19 and routes the data output streams on the I/O buses 13 and 23 to a voter delay buffer 50 via a delay buffer line 47. Specifically, the data received from the first CPU 11 is sent to a first FIFO buffer 51, and the data received from the second CPU 21 is sent to a second FIFO buffer 52. This action serves to prevents the peripherals from being sent data which may have been corrupted by the malfunctioning CPU, and also serves to save data which otherwise may have been lost or discarded while the malfunctioning CPU was being identified.

In a preferred embodiment, the maintenance and diagnostic subsystems 15 and 25 continually run their respective diagnostic procedures. It should be understood that, even after the STOP command has been issued to the CPUs 11 and 21, the I/O module 40 continues to forward input data streams sent by the peripheral devices to the CPUs 11 and 21. The CPUs 11 and 21 continue to process the data while running the diagnostic procedures, in accordance with normal operational procedures. The computer system 10 is thus seen by the peripheral devices as functioning normally.

Figure 2:
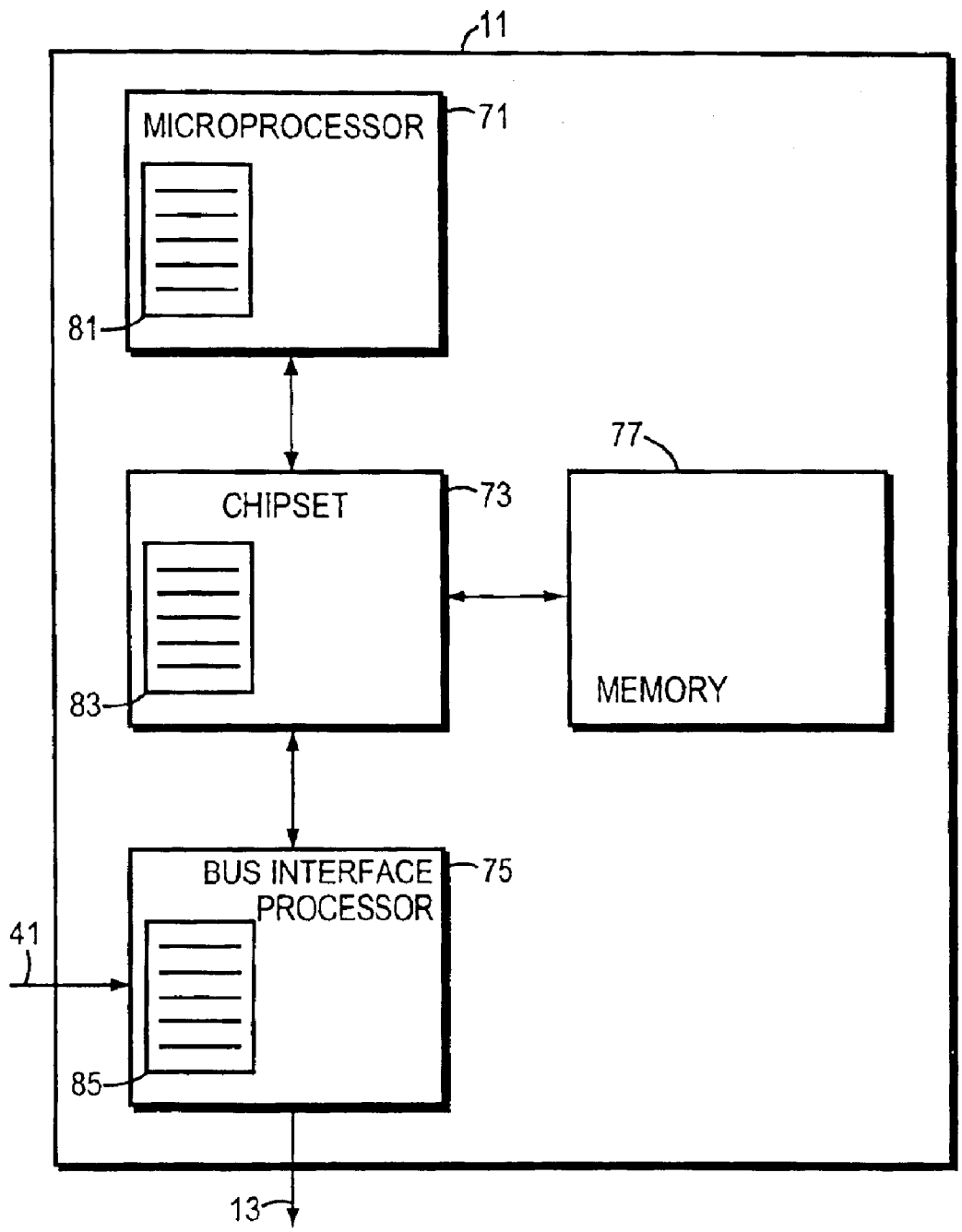
FIG. 2 is a functional block diagram of a CPU in the fault-tolerant computer system of FIG. 1.

As shown in FIG. 2, the first CPU 11 preferably includes a microprocessor 71, a chipset 73, and a bus interface processor 75. A memory 77 is provided for internal storage of data, as required. The microprocessor 71 receives data from and outputs data to either the memory 77 or the first I/O bus 13 via the chipset 73. Output data to be transmitted by the bus interface processor 75 is held in a buffer 85. When the STOP command is transmitted on the first command line 41 to the bus interface processor 75, the data present in the buffer 85 is retained and not transmitted to the I/O module 40. Because there is finite propagation delay incurred before the STOP signal reaches the bus interface processor 75, some possibly corrupted data may be sent from the first CPU 11 before the STOP signal is received. This data is sent to the voter delay buffer 50, as described above.

As the first CPU 11 continues its processing and diagnostic operations, output data is retained in the buffer 85. If the buffer 85 becomes fill, the bus interface processor 75 sends a BUSY signal to the chipset 73, and further processed data is then stored in a chipset buffer 83. If the chipset buffer 83 becomes full, the data output stream is stored in a microprocessor buffer 81. The output data stored in the buffers 81, 83, and 85 is not output to the peripherals unless the first CPU has been identified as the correctly-functioning CPU, as described in greater detail below. The second CPU 21 (not shown) has an internal configuration similar to that of the first CPU 11, described above, and functions in a similar manner.

Figure 3:
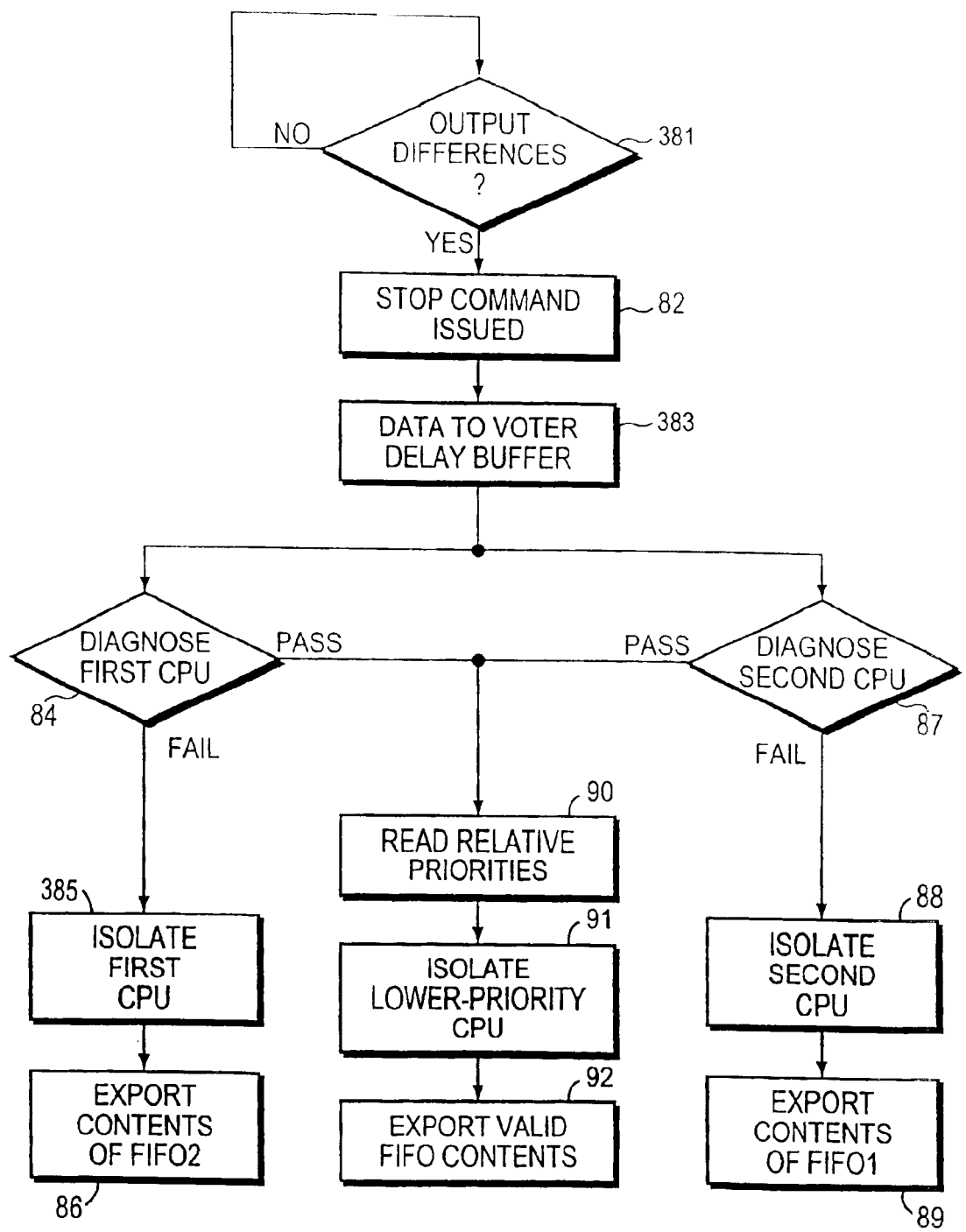
FIG. 3 is a flow diagram illustrating the operation of the fault-tolerant computer system of FIG. 1.

Operations of the computer system 10 can best be described with reference to the flow diagram of FIG. 3. The data output streams on the I/O buses 13 and 23 are bit-by-bit compared by the comparator 43, at box 381, to provide a comparative reading from which it can be determined if there are differences between the monitored data output streams. If there are no such differences detected, the comparator 43 continues to monitor the data output streams. If differences are detected, the STOP command is issued, at box 82. Subsequently, the data output streams on the I/O buses 13 and 23 are diverted to the voter delay buffer 50, at step 383.

The first CPU 11 continues executing its ongoing diagnostic procedure, at box 84. If the diagnosis indicates that the first CPU 11 is malfunctioning, the first CPU 11 is isolated, at box 385, and operation of the computer system 10 continues with the second CPU 21. The data stored in the second FIFO buffer 52 is output over the system I/O bus 19, at box 86, and thereafter subsequently processed data from the second CPU 21 is output over the system I/O bus 19. Contemporaneously with the ongoing diagnosis procedure in the first CPU 11, at box 84, the second CPU 21 also continues diagnosis, at box 87. If, on the other hand, the resulting diagnosis indicates that the second CPU 21 is malfunctioning, the second CPU 21 is isolated, at box 88, and operation of the computer system 10 continues with the first CPU 11. The data stored in the first FIFO buffer 51 is output over the system I/O bus 19, at box 89, and subsequent processed data from the first CPU 11 is output over the system I/O bus 19.

If the diagnostic procedures fail to detect problems with either the first CPU 11 or the second CPU 21, the relative CPU priorities are used as the determinative factor. The relative priorities are read to establish which of the first CPU 11 the second CPU 21 has the higher priority, at box 90. As discussed above, the relative priorities of the CPUs have been determined by one or more criteria, such as their operational histories or the comparative cumulative record of their internal error corrections. If the second CPU 21 has been assigned the higher priority, for example, the computer system 10 selects the first CPU 11 as the malfunctioning CPU and continues to operate with only the second CPU 21, at box 91. Accordingly, the data stored in the second FIFO buffer 52 is output, at box 92, and so forth. On the other hand, if the first CPU 11 has been assigned the higher priority, the computer system 10 selects the second CPU 21 as the malfunctioning CPU and the operation of the computer system 10 continues with the first CPU 11, at box 91. Subsequently, the data stored in the first FIFO buffer 51 is output, at box 92.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A fault-tolerant computer system suitable for exchanging data with peripheral devices, said computer system comprising:
    a first central processing unit (CPU) having at least one first CPU buffer,
    a second CPU having at least one second CPU buffer, said second CPU being operationally coupled to said first CPU, such that the output of said second CPU is essentially identical to the output of said first CPU;
    a voter delay buffer having a first FIFO buffer and a second FIFO buffer;
    an I/O module connected to receive data output streams from said first CPU and said second CPU, said I/O module having,
    a comparator for comparing said first CPU data output stream to said second CPU data output stream so as to produce a comparison reading;
    transmission means responsive to said comparator, for sending said first CPU data output stream to the peripheral devices, if said comparison reading indicates no difference between said first CPU data output stream and said second CPU data output stream; and
    routing means responsive to said comparator, for routing said first CPU data output stream to said first FIFO buffer if said comparison reading indicates a difference between said first CPU data output stream and said second CPU data output stream, and for routing said second CPU data output stream to said second FIFO buffer if said comparison reading indicates a difference between said first CPU data output stream and said second CPU data output stream,
    wherein said first FIFO buffer buffers said first CPU data output stream and said second FIFO buffer buffers said second CPU data output stream;
    a priority module for receiving first error correction information from said first CPU and second error correction information from said second CPU; and
    priority logic for assigning relative priorities to said CPUs, said assigned relative priorities being determined as a function of said first and second error correction information.

2. The computer system of claim 1 wherein said priority logic assigns a higher priority to selected one of said first and second CPUs if the indicated error rate in said correction information corresponding to said selected CPU is less than the indicated error rate in said correction information corresponding to the other one of said first and second CPUs.

3. The computer system of claim 1 wherein said priority logic assigns a higher priority to a selected one of said first and second CPUs if said selected CPU has been operating in said computer system for a greater length of time than the length of time the other one of said first and second CPUs has been operating in said computer system.

4. The computer system of claim 1 wherein said transmission means is further responsive to said priority logic such that
    the contents of said first FIFO buffer is transmitted to the peripheral devices if said first CPU has been assigned a higher said relative priority, or
    the contents of said second FIFO buffer is transmitted to the peripheral devices if said second CPU has been assigned a higher said relative priority.

5. The computer system of claim 1 wherein said transmission means is further responsive to said priority logic such that
    the contents of said first CPU buffer is transmitted to the peripheral devices if said first CPU has been assigned a higher said relative priority, or
    the contents of said second CPU buffer is transmitted to the peripheral devices if said second CPU has been assigned a higher said relative priority.

6. The computer system of claim 1 further comprising a first diagnostic logic resident in said first CPU and a second diagnostic logic in said second CPU.

7. The computer system of claim 6 wherein said I/O module further comprises identification means responsive to said first diagnostic logic and said second diagnostic logic, for identifying one of said first and second CPUs as malfunctioning.

8. The computer system of claim 7 wherein said transmission means is further responsive to said identification means such that
    the contents of said first FIFO buffer is transmitted to the peripheral devices if said second CPU is identified as malfunctioning, or
    the contents of said second FIFO buffer is transmitted to the peripheral devices if said first CPU is identified as malfunctioning.

9. The computer system of claim 7 wherein said transmission means is further responsive to said identification means such that
    the contents of said first CPU buffer is transmitted to the peripheral devices if said second CPU is identified as malfunctioning, or
    the contents of said second CPU buffer is transmitted to the peripheral devices if said first CPU is identified as malfunctioning.

10. A method for reliably exchanging data between peripheral devices and a computer system having a first CPU with a buffer operating in lock-step with a second CPU with a buffer, said method comprising the steps of:
    comparing a data output stream from the first CPU with a contemporaneous data output stream from the second CPU to obtain a bit-by-bit comparative reading;
    transmitting said first CPU data output stream to the peripheral devices if said comparative reading indicates no difference between said first CPU data output stream and said second CPU data output stream;
    transmitting said first CPU data output stream to a first FIFO buffer if said comparative reading indicates a difference between said first CPU data output stream and said second CPU data output stream, and transmitting said second CPU data output stream to a second FIFO buffer if said comparative reading indicates a difference between said first CPU data output stream and said second CPU data output stream;

buffering each bit of said first CPU data output stream in said first FIFO buffer; buffering each bit of said second CPU data output stream in said second FIFO buffer;

executing contemporaneous respective diagnostic procedures in the first CPU and the second CPU;

retaining at least a second portion of said first CPU data output stream in the first CPU buffer if said diagnostic procedures indicate the fist CPU to be malfunctioning: and retaining at least a second portion of said second CPU data output stream in the second CPU buffer if said diagnostic procedures indicate the second CPU to be malfunctioning.

11. The method of claim 10 further comprising the steps of:

transmitting the contents of said second FIFO to the peripheral devices if said diagnostic procedures indicate the first CPU to be malfunctioning; and transmitting the contents of said first FIFO to the peripheral devices if said diagnostic procedures indicate the second CPU to be malfunctioning.

12. The method of claim 11 further comprising the steps of:

isolating the first CPU if said diagnostic procedures indicate the first CPU to be malfunctioning; and isolating the second CPU if said diagnostic procedures indicate the second CPU to be malfunctioning.

13. The method of claim 10 further comprising the steps of:

accessing a first error correction history for the first CPU;

accessing a first error correction history for the second CPU;

if said error correction histories indicate that the second CPU has a higher error correction rate than the first CPU, assigning a higher priority to the first CPU; and if said error correction histories indicate that the first CPU has a higher error correction rate than the second CPU, assigning a higher priority to the second CPU.

14. The method of claim 13 further comprising the steps of:

transmitting the contents of said first FIFO to the peripheral devices if the first CPU has been assigned a higher priority; and transmitting the contents of said second FIFO to the peripheral devices if the second CPU has been assigned a higher priority.

15. The method of claim 10 further comprising the steps of:

transmitting the contents of said first CPU buffer to the peripheral devices if said diagnostic procedures indicate the second CPU to be malfunctioning; and transmitting the contents of said second CPU buffer to the peripheral devices if said diagnostic procedures indicate the first CPU to be malfunctioning.

* * * * *